May 27, 1969
C. W. CANNON
HYDRAULIC TRANSMISSION SYSTEM FOR DRIVING STEERABLE WHEELS OF A MOTOR VEHICLE
Filed June 12, 1967
3,446,305
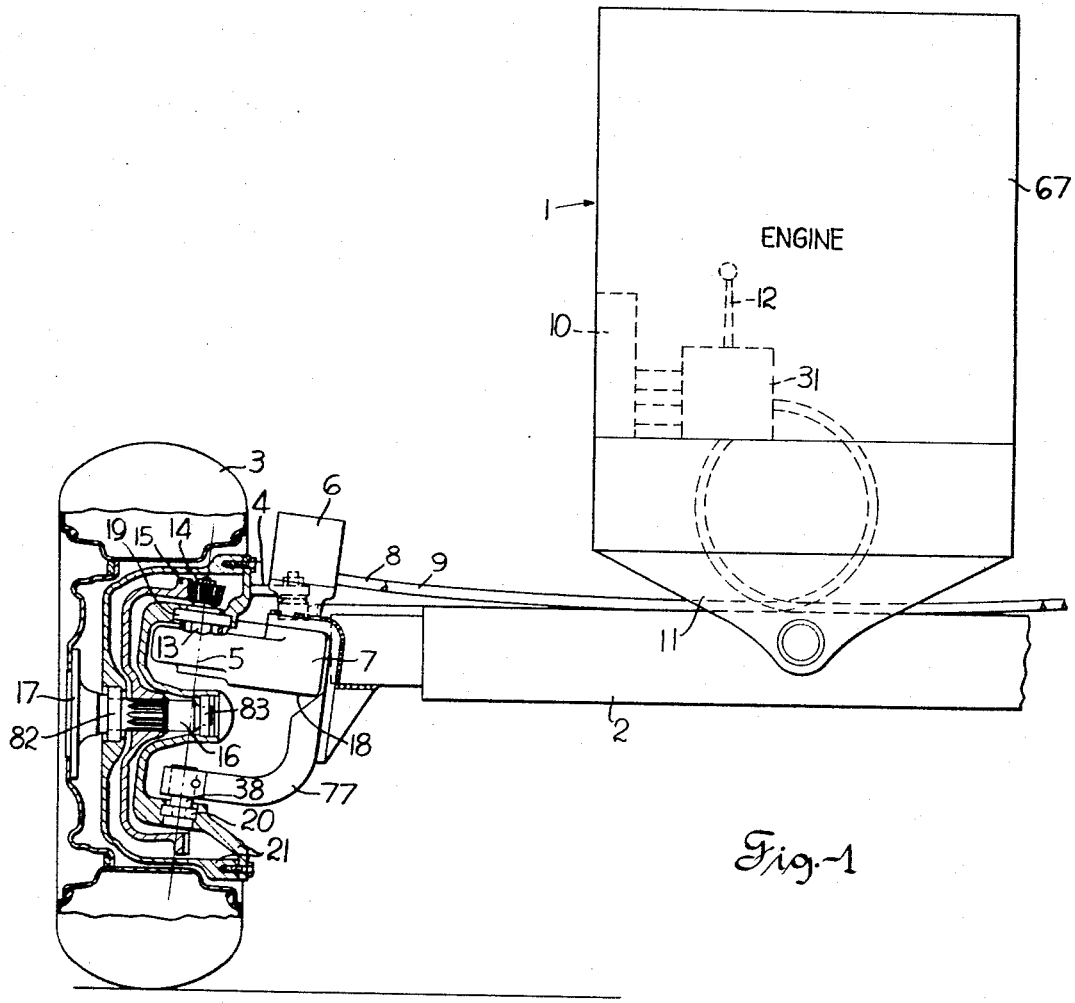
Fig.-1
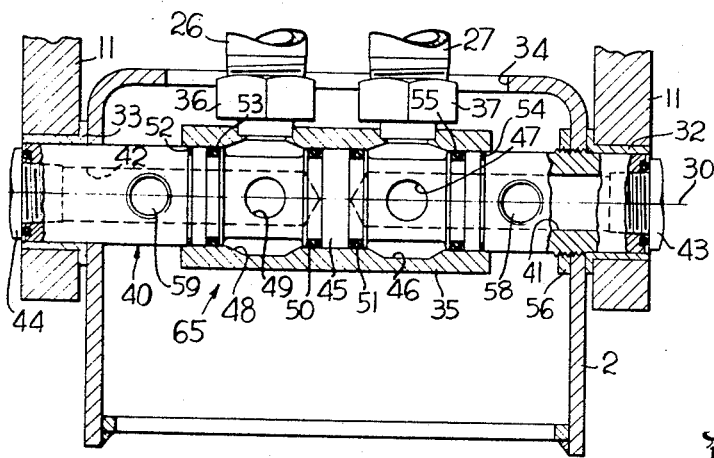
Fig.-2

United States Patent Office 3,446,305
Patented May 27, 1969

3,446,305
HYDRAULIC TRANSMISSION SYSTEM FOR DRIVING STEERABLE WHEELS OF A MOTOR VEHICLE
Craig W. Cannon, New Berlin, Wis., assignor to Allis-Chalmers Manufacturing Company, Milwaukee, Wis.
Filed June 12, 1967, Ser. No. 645,294
Int. Cl. B62d 7/00, 7/06
U.S. Cl. 180—43                        8 Claims

ABSTRACT OF THE DISCLOSURE

A high pressure hydrostatic drive system having conduits and connectors positioned in such a manner to substantially reduce the bending curvature of the conduit or eliminate their need for bending entirely.

---

This invention relates to a hydrostatic drive system and more particularly to a manner of adapting hydraulic conduits and connectors to reduce the bending curvature or eliminate the need for flexible conduits entirely.

Hydrostatic transmissions with the pump and motor connected in a closed hydraulic loop provide versatility which is not inherent in any other type of drive system. These systems permit the tractor to be accelerated, decelerated, and reversed all in response to a single control lever. The system provides for infinite ground speed and also hydraulic braking which is limited only by the engine speed and the power for driving the pump.

The demand for increased power in this type of a system has required increased hydraulic fluid pressure which in turn necessitates that the quality of the components must also be raised. Although this will require a moderate cost increase, recent advancement in the industry has made possible the manufacturing with close tolerances and the performance requisite of these types of systems. Heating increases as the pressure increases due to throttling and fluid friction in the system. These problems can be overcome and are secondary considering the improved performance of these types of systems.

The front wheel assist type of hydraulic transmission system drives the front wheels by individual hydrostatic units mounted on the front end of the vehicle. Hydraulic fluid provides distribution of power to either motor and overcomes the problem of bucking which is often present in a mechanical four-wheel drive system. Various hydraulic systems may be used which employ variable displacement pumps or variable displacement motors or any combination of either of the two to provide the desired torque or speed for whatever purpose the vehicle may be used.

The major problem in adapting a front wheel drive motor for use in the hydrostatic transmission lines carrying pressurized fluid in the neighborhood of several thousand pounds per square inch is the relatively inflexible condition of the transmission lines. Any flexing of the conduits causes high stresses and particularly if the bending radius is increased substantially. Accordingly, the front wheel drive units and the conduits must permit steering movement of the front wheel which is inherent in this type of vehicle. The conventional front wheel units are mounted on the vehicle wheel structure and steer with wheel assembly. Accordingly, the flexible conduits must bend which places considerable stress on the conduits themselves. This invention is intended to provide a means whereby only a limited amount of flexing of the conduits is necessary or the need of flexibility may be completely eliminated and a rigid conduit may replace flexible hoses. The use of a rigid or inflexible conduit permits the use of metal or some material which has substantially higher rupture stress than the conventional flexible hose. It is also understood that if a conduit itself does not flex the stress placed on the conduit is substantially less for a given pressre and the danger of rupture is substantially lessened.

It is an object of this invention to provide a hydraulic system whereby various components of the system are mounted on mechanical parts which move relative to each other and the components of this system are so adapted and positioned to substantially reduce flexing of the conduits or completely eliminate the need for flexible conduits.

It is another object of this invention to provide a hydrostatic system which uses pivotal hydraulic connectors which pivot on an axis coincidental with the pivotal axis of the mechanical parts to eliminate the need for flexible conduits.

It is a further object of this invention to provide relatively inflexible hydraulic conduits positioned in such a manner to reduce the bending curvature of the conduit and thereby reduce the stress inherent in the conduit.

It is a further object of this invention to drive a steerable vehicle wheel through a hydrostatic system which utilizes relatively inflexible conduits having high tensile strength for transmission of high pressure hydraulic fluid.

The objects of this invention are accomplished in a hydrostatic system having a vehicle supported power driven pump hydraulically connected to a drive motor for driving a steerable vehicle wheel. The drive motor drives mechanically through an axis about which the steerable wheel pivots when the wheel is being steered. The axle supporting the drive motor pivots relatively to the body. The pivotal movement of the axle relative to the vehicle body is a limited movement in contrast to the steering angle through which the steerable wheel moves when the vehicle is steered. By the positioning of the conduits on the vehicle body the bending curvature can be substantially reduced and accordingly the stress placed on the conduits is substantially lowered.

A further modification of this system is provided wherein the conduits which are connected between the motor and the pump are connected through swivel fittings mounted on the axis about which the front axle pivots in its connection to the vehicle body. By connecting the fluid conduits in this manner the pivoting action between the axle and the body does not change the linear dimension of the conduits between the pump and the swivel fittings nor between the swivel fittings and the fluid motor. Accordingly, it is possible to make connection between the fluid motor and the fluid pump with conduits of a rigid material. The invention makes it possible that conduits of either limited flexibility or rigid material may be used.

The preferred embodiments of this invention will be described in the following paragraphs. The attached drawings illustrate this invention in its preferred form.

FIG. 1 is a front view of the vehicle with the right hand wheel shown in section to illustrate the wheel mounting.

FIG. 2 is a cross section view taken on line II—II of FIG. 4.

Figure 3:
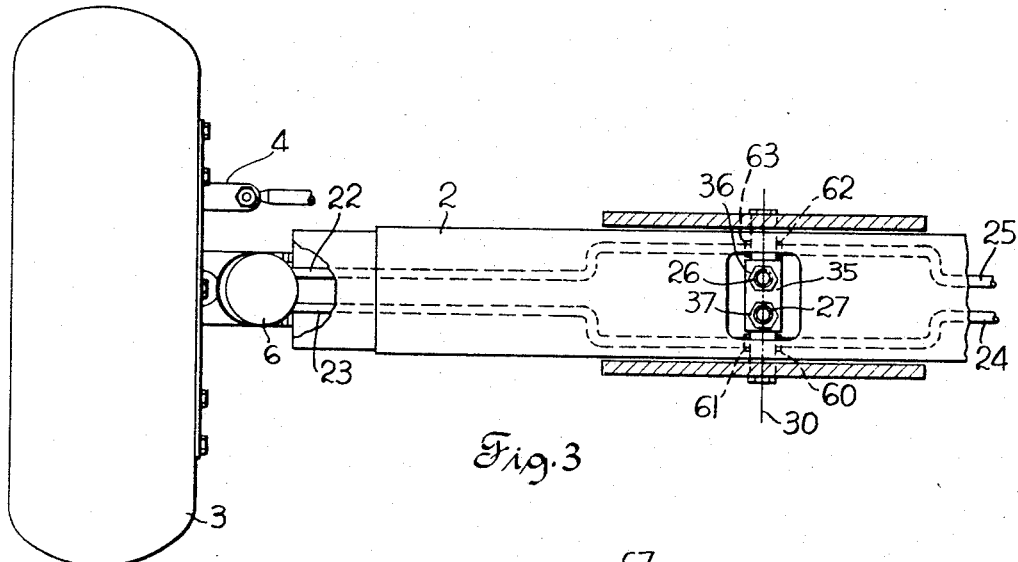
FIG. 3 is a plan view of a modification showing the front axle and right front wheel with the section III—III cut through the vehicle supporting bracket as shown in FIG. 4.

Referring to FIG. 1 the vehicle body 1 is pivotally supported on a front axle 2 which is supported by the vehicle wheel 3. The vehicle wheel 3 is steered by a steering arm 4 which is connected by the tie-rod to a suitable steering mechanism on the vehicle body.

The wheel 3 is steerable about an axis 5 which is coincidental with the mechanical drive axis for transmission of power from the motor 6 through the transmission 7 to the vehicle wheel 3. The motor 6 is connected by the conduits 8 and 9 to the hydraulic pump 10 on the body 1. The pump 10 operates through a valve 31 having a control lever 12 which is manually operated in a forward or rearward direction to operate the motor 6 in forward or reverse for driving the wheel 3. The body 1 of the vehicle is supported by a bracket 11 which is pivotally connected to the axle 2. The axle 2 tilts and rocks underneath the body 1 caused by a raising or lowering of the vehicle wheel 3. The conduits 8 and 9 are connected to the motor 6 and horizontally to a point near the pivotal axis between the body 1 and axle 2. As the axle pivots only a limited amount of bending is required of the conduits 8 and 9. The limited bending of the conduits correspondingly reduces the bending stresses created in the conduits 8 and 9 because the deformation in the conduits is reduced.

It can be seen that the motor 6 is driven by the high pressure fluids in the conduits 8 and 9 and the motor drives through the transmission 7 having a rotating shaft 13 connected to a bevel pinion gear 14 driving a ring gear 15. The ring gear 15 is spline connected to the shaft 16. The shaft 16 is integral with a radial flange 17 which is fastened to the wheel 3 by suitable fastening means. With this drive mechanism the motor is mounted in fixed relation to the front axle 2 and any movement in transmission of power from the motor 6 to the wheel 3 is through the shaft 13 which rotates on an axis coincidental with the kingpin axis or the steering axis of the wheel 3. The wheel 3 is supported for pivotal movement about the same axis as the axis of rotation of the shaft 13 by means of the bracket 77 which is connected to the axle 2 and the transmission housing 18 which is also fastened to the front axle 2. The bearing assembly 19 fastened to the transmission housing rotatably supports bracket 21 and the vehicle wheel assembly on its upper portion. The lower portion of brackets 21 and the vehicle wheel assembly is pivoted on the bearing assembly 20 receiving the stub shaft 38. The bracket 21 pivotally supports the wheel assembly for pivotal movement about the pivotal axis 5 which is coincidental to the rotating axis of the shaft 13. The wheel supporting bracket 21 receives the bearings 82 and 83 which rotatably support the spindle 16. The spindle 16 is fastened to the wheel 3 and rotates about a substantially horizontal axis.

The motor 6 drives the wheel 3 through a mechanical connection which eliminates the need for hydraulic fittings or connectors between the conduits 8 and 9. The steering movement of the vehicle wheel 3 about a pivotal axis 5 is accomplished without producing any bending stresses on the conduits 8 and 9. The only bending of the conduits necessary is required from the tilting of the axle 2 relative to the body 1.

Figure 4:
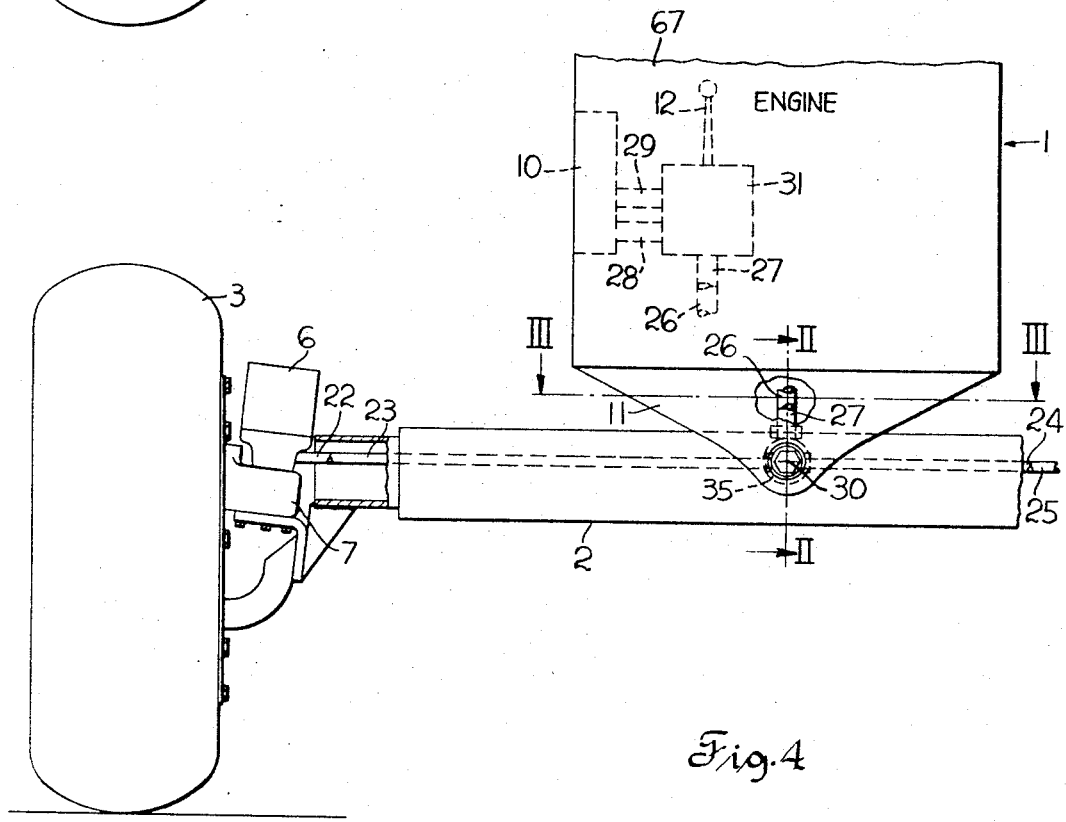
FIG. 4 is a front view of the modification wherein the swivel fittings are located on the pivotal axis of the front axle.

Referring to FIGS. 2, 3, and 4 a modification of the hydrostatic transmission system is illustrated. FIG. 4 shows a front view of the vehicle taken in the same direction as FIG. 1. The wheel assembly is not shown in cross section although the drive mechanism and the pivoting action of the wheel when it is steered is the same. The motor 6 is fixed to the axle 2 and is connected to rigid conduits 22 and 23. The rigid conduits extend transversely through the hollow axle 2 which is shown in a fragmentary cross section in FIG. 2. The front axle 2 pivots relative to the bracket 11 of the body 1 of the vehicle. The feed and return conduits 22 and 23 are hydraulically connected through a swivel fitting on a pivotal axis of the front axle 2. Hydraulic conduits 24 and 25 extend transversely to the opposite side of the vehicle to a hydraulic motor not shown for driving the left hand front wheel.

FIG. 3 is a plan view showing the motor 6 mounted on the axle 2. The conduits 22 and 23 are shown in a section broken away in the front axle 2. The conduits 26 and 27 are connected to the valve 31. The valve 31 controls the actuation of the motor 6. The valve 31 is connected by the conduits 28 and 29 to the pump 10. The pump 10 is driven by the internal combustion engine which drives the vehicle. It can be seen from FIGS. 3 and 4 that the linear dimension of the conduits 22 and 23 is a constant dimension from the pivotal axis 30 to the connection to the pump 6; a constant linear dimension is also present between the axis 30 and the valve 31, or the axis 30 and the pump 10. These dimensions are held constant and accordingly with the front axle 2 pivoting about the axis 30 the conduits may be constructed of a rigid material such as metal which has a substantially higher rupture stress than flexible conduits that are constructed of fabric and rubberized material.

Referring to FIG. 2 the swivel fitting is shown in cross section to illustrate its manner of operation. The bracket 11 is shown in cross section receiving the bushings 32 and 33. The bushings 32 and 33 permit pivotal movement between the bracket 11 and the axle 2. An opening 34 is formed in the axle 2 to receive the conduits 26 and 27. The conduits 26 and 27 are connected to the sleeve 35 by means of the connectors 36 and 37 respectively. The sleeve 35 may be nonrotatably connected to the bracket 11 by a fastening means which extends through perforation 34 in the upper wall of the axle 2 if the conduits 26 and 27 are of a flexible material. This is merely a refinement in the construction because the conduits 26 and 27 would be fixed relative to the body 1 and would maintain the position of the sleeve 35 fixed relative to the body by their own rigidity if they were inflexible. The fastening means would make it possible for the use of flexible or nonflexible type of conduits 26 and 27.

The pivot pin 40 is received within the bushing 32 and 33 and is drilled from both ends to form openings 41 and 42 within the center portions of the pin 40. The end plugs 43 and 44 close the ends of the openings 41 and 42. The center wall 45 separates the openings 41 and 42. The sleeve 35 is formed with an annular recess 46 in communication with the drilled passage 41 through a plurality of openings 47. The annular recess 46 is connected to the conduit 27 through the central opening in the connector 37.

A like annular recess 48 is formed in the inter periphery of the sleeve 35 axially spaced from the recess 46. A plurality of openings 49 provide communication between the drilled passage 42 and the recess 48. The annular recess 48 is in communication with the conduit 26 through a central opening in the connector 36.

Suitable seals are received in the annular recesses formed in the external periphery of the hollow pin 40. The seals 50 and 51 provide a seal between the recesses 46 and 48 and the seals 52 and 53 provide a seal between the external side of the sleeve 35 and the recess 48. The seals 54 and 55 provide a seal between the recess 46 and external side of the sleeve 35.

The hollow pin 40 is screwed in the axle and is locked to the axle by means of the locknut 56 which engages the inner portion of the axle 2 and which is threadedly engaged on the outer periphery of the hollow pin 40. The pin 40 is fixed relative to the axle 2 and openings 58 and 59 are formed horizontally in the pin 40 for receiving connectors. The holes 58 receive the connectors 60 and 61; the holes 59 receive the connectors 62 and 63.

The conduits 22 and 23 are fixed in the axle 2 and pivot relative to the bracket 11 as the axle tilts about an pivot 30. The hollow pin 40 is locked to the axle and axis 30. Accordingly there is no movement between the pin 40 and the motor 6 which is fastened on the opposite ends of the condits 22 and 23. The dimension from the axis to the motor 6 is constant.

The conduits 26 and 27 are fastened to the body 1 and also fastened to the sleeve 35 and pivot about the axis 30. The dimensions between the axis 30 and the valve 31 or the axis and the pump 10 are fixed dimensions. It can be seen that the conduits used in this hydraulic system may be either flexible or rigid. If the conduits be flexible there is no increase in the stress of the conduits caused by bending because there is no bending or flexing of the conduits in the system.

The axis 30 is the mechanical pivotal axis between the tractor body and the front axle which is also the pivotal axis of the swivel fitting 65.

The operation of the hydraulic system will be described in the following paragraphs.

The pump 10 is driven by the engine 67. The pump 10 may be a variable volume pump and the motor 6 may be a variable volume motor with the control valve 31 intermediate the pump and motor to control the direction of fluid flow in the system. The system as shown is a closed end hydraulic system which will provide a forward and rearward rotational movement of the motor 6 and an infinite ratio of varying speeds. The speed is dependent on the engine speed as well as the ratio displacement between the pump and the motor. The control lever 12 controls the direction of the hydraulic fluid from the pump 10 to the motor 6 and consequently this controls the direction of rotation of the motor and the direction of the rotation of the wheel 3. The pivotal movement of the axle 2 causes a limited bending movement on the conduits 8 and 9. The bending stress created in the conduits 8 and 9 is limited because of the small bending curvature of the conduits which creates a minimum stress in the conduits carrying the high pressure fluid. There is no movement required in the conduits because of steering of vehicle wheel by the steering mechanism 4. The only bending movement is caused by the tilting of the front axle relative to the vehicle body 1.

FIGS. 2, 3, and 4 illustrate the modification wherein rigid conduits may be used in place of flexible conduits 8 and 9. The axis of the swivel fitting 65 is on an axis coincidental with the tilting axis of the front axle relative to the body 1. The conduits 26 and 27 are fixed relative to the body 1 and the conduits 22 and 23 are fixed relative to the axle 2.

As the vehicle axle 2 pivots about the axis 30 of the hollow pin 40 the dimensions of the hydraulic conduits remain constant and fluid is transmitted through the swivel fitting to hydraulic motors positioned on the right and left hand sides of the axle 2. The pressurized fluid is transmitted from the pump through the valve to the motor and is returned from the motor through the valve to the pump. The power generated at the pump is transmitted by fluid transmission through the mechanical pivotal axis between he bracket 11 and the front axle 2 through a swivel fitting. The power is then delivered to the motor 6 which drives through a mechanical transmission 7 having a rotating element 13 driving a bevel pinion gear 14 which in turn rotates the ring gear 15. The power is transmitted through the transmission having an element rotating on an axis concidential with a kingpin axis of the wheel 3. Accordingly, there is no need for the conduits to flex and high pressure fluid may be transmitted through the hydraulic system without danger of rupture.

The preferred embodiments of this invention have been illustrated and described and the invention claimed will be defined by the following attached claims.

The embodiments of the invention in which an exclusive property or privilege is claimed are defined as follows:

1. A hydraulic transmission system for use in a vehicle comprising a vehicle body pivotally supported on a front axle defining a rocking axis, a source of pressurized fluid having means for controlling the rate and direction of flow of fluid mounted on said body, at least one steerable vehicle wheel pivotally supporting said axle and defining a pivotal kingpin axis, a hydraulic motor mounted on said axle having a power transmission driving a pinion shaft carrying a pinion defining an axis of rotation coincidental with said pivotal kingpin axis for driving said wheel, a hydraulic conduit means connected to said motor and extending to a point adjacent the rocking axis of said axle and further extending to connect to said source of pressurized fluid to generally define a large arcuate curve and thereby provide a hydraulic transmission system having components mounted on the mechanical elements pivoting relative to each other in a manner reducing the stress produced in the conduit means caused by movement of the related mechanical parts in the system while the vehicle is being operated.

2. A hydrostatic transmission for use on a vehicle comprising a vehicle body pivotally supported on a front axle defining a rocking axis, at least one steerable vehicle wheel pivotally supporting said axle and defining a pivotal steering axis, a source of pressurized fluid having means for controlling fluid flow mounted on said body, a motor mounted on said axle driving said wheel through a transmission having a rotating element rotating on an axis coincidental with said pivotal steering axis, a swivel fitting having an axis mounted coincidental with a rocking axis of said front axle, first conduit means connecting said motor with said swivel fittings, second conduit means connecting said swivel fittings to said source of pressurized fluid to thereby provide means for eliminating flexing of said first and second conduit means.

3. A hydrostatic transmission as set forth in claim 2 wherein said swivel fitting includes a hollow pivot pin pivotally supporting said body on the rocking axis of said front axle.

4. A hydrostatic transmission system as set forth in claim 2 wherein said swivel fitting includes a hollow pin stationary relative to said front axle and a sleeve stationary relative to the body of said vehicle to thereby eliminate any need for flexing of said first and second conduit means.

5. A hydrostatic transmission system as set forth in claim 2 wherein said swivel fitting includes a pivot pin having a central wall separating two axial passages communicating with transverse openings for connection with said conduit means connected to said motor.

6. A hydrostatic transmission system as set forth in claim 2 wherein said axle is hollow and said conduit means connecting said swivel fitting to said motor extends transversely within a hollow front axle.

7. A hydrostatic transmission system as set forth in claim 2 wherein said first and second conduit means are rigid and relative movement of mechanical components are accommodated by the pivotal movement of said swivel fitting.

8. A hydrostatic transmission system as set forth in claim 2 wherein the dimensions between the rocking axis and said motor and the rocking axis and said source of pressurized fluid are dimensions of constant lengths.

References Cited

UNITED STATES PATENTS

| | | | |
|---|---|---|---|
| 1,840,407 | 1/1932 | Norman | 180—43 |
| 2,431,719 | 12/1947 | Wilkin | 180—66 X |
| 3,044,567 | 7/1962 | Reed et al. | 180—45 |
| 3,225,855 | 12/1965 | Sherwen | 180—43 |

FOREIGN PATENTS

| | | |
|---|---|---|
| 1,022,415 | 3/1966 | Great Britain. |

A. HARRY LEVY, *Primary Examiner.*

U.S. Cl. X.R.

180—66; 280—111; 285—272